United States Patent [19]

Welch

[11] Patent Number: 5,163,730

[45] Date of Patent: Nov. 17, 1992

[54] ENERGY ABSORBING MOLDING ATTACHMENT BRACKET

[75] Inventor: Jeffrey A. Welch, St. Clair Shores, Mich.

[73] Assignee: General Motors Corporation, Detroit, Mich.

[21] Appl. No.: 753,477

[22] Filed: Sep. 3, 1991

[51] Int. Cl.⁵ ............................................. B62D 25/00
[52] U.S. Cl. ................................. 296/189; 280/751
[58] Field of Search ..................... 296/189, 187, 202; 280/748, 751

[56] References Cited

U.S. PATENT DOCUMENTS

| | | | |
|---|---|---|---|
| 3,774,713 | 11/1973 | Stegmaier | 180/90 |
| 3,779,595 | 12/1973 | Suzuki et al. | 296/28 |
| 3,806,154 | 4/1974 | Akiyama | 280/150 |
| 3,831,705 | 8/1974 | Glance | 180/90 |
| 3,924,707 | 12/1975 | Renner et al. | 180/90 |
| 3,951,427 | 4/1976 | Wilfert | 280/732 |
| 4,123,085 | 10/1978 | Oda et al. | 280/752 |
| 4,229,036 | 10/1980 | Toda | 296/202 |
| 4,591,204 | 5/1986 | Gallitzendoerfer | 296/202 |
| 5,056,850 | 10/1991 | Kalcherian et al. | 296/202 |

*Primary Examiner*—Robert R. Song
*Attorney, Agent, or Firm*—Raymond I. Bruttomesso, Jr.

[57] ABSTRACT

An assembly for mounting a molding to a vehicle body has a windshield supported by a pillar. The pillar has an outer pillar component and an inner pillar component with the components mounted together. A one piece energy absorbing bracket is interposed between the pillar and the molding. The energy absorbing bracket has a base mounted to the inner pillar component. A mounting portion of the bracket conforms to the shape of the molding and carries the molding. A support portion connects the mounting portion to the base and spaces the molding from the pillar. A foot of the bracket engages the pillar to provide stability of the bracket relative to the pillar. A buckling portion connects the mounting portion to the foot and is adapted to undergo deformation when subject to a force of impact transmitted through the molding. The components of the pillar each have a channel shape and open towards each other.

10 Claims, 2 Drawing Sheets

ENERGY ABSORBING MOLDING ATTACHMENT BRACKET

This invention relates to an assembly for mounting a molding and more particularly to a bracket that secures the molding to the frame of the vehicle and absorbs energy of a force hitting the molding.

BACKGROUND OF THE INVENTION

It is common to mount a molding to a frame which extends up to the roof on the sides of the windshield. The frame is commonly called an "A" pillar or windshield pillar. The molding functions to make the interior of the vehicle more aesthetically pleasing by concealing the pillar from view.

It has also been recognized that the interior of the vehicle should be occupant friendly. Designs have incorporated padded and redesigned dashboards and collapsible steering wheels to make the interior of the vehicle occupant friendly in addition to airbags and seat belt systems.

In addition, U.S. Pat. No. 3,779,595 discloses a pillar comprised of a channel-shaped outer pillar component arranged vertically with its open side facing the inside of the room. A channel-shaped inner pillar component is fitted in the outer pillar component and joined to provide a pillar having a closed space therein. A protector device is disposed with its open side facing the open side of the inner pillar component and its opposite edges being disposed near the portion of the outer pillar component. The protector device has a width greater than the width of the outer pillar component and is adapted to undergo plastic deformation when subjected to a force of impact higher than the value at which the protector means is set, and a shock absorber mechanism disposed in a space between the inner pillar component and the protector device so as to connect them together.

It would be desirable to have a one-piece bracket interposed between a molding and a pillar and mounting the molding on the pillar in spaced relation therefrom in order to permit energy absorbing excursion of the molding toward the pillar as permitted by yielding and deformation of the bracket under occupant contact thereagainst.

SUMMARY OF THE INVENTION

This invention provides an assembly for mounting a molding to a vehicle body having a windshield supported by a pillar. The pillar has an outer pillar component and an inner pillar component with the components mounted together. A one-piece energy absorbing bracket is interposed between the pillar and the molding. The energy absorbing bracket has a base mounted to the inner pillar component. A mounting portion of the bracket conforms to the shape of the molding and carries the molding. A support portion connects the mounting portion to the base and spaces the molding from the pillar. A foot of the bracket engages the pillar to provide stability of the bracket relative to the pillar. A buckling portion connects the mounting portion to the foot and is adapted to undergo deformation when subject to a force of impact transmitted through the molding. The components of the pillar each have a channel shape and open towards each other.

One object, feature and advantage resides in the provision of a one-piece energy absorbing bracket interposed between a molding and a pillar to absorb the energy of a force hitting the molding.

Another object, feature and advantage resides in the provision of the bracket having both a support piece to carry and space the molding from the pillar and a buckling portion adapted to undergo deformation when subject to a force of impact transmitted through the molding.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
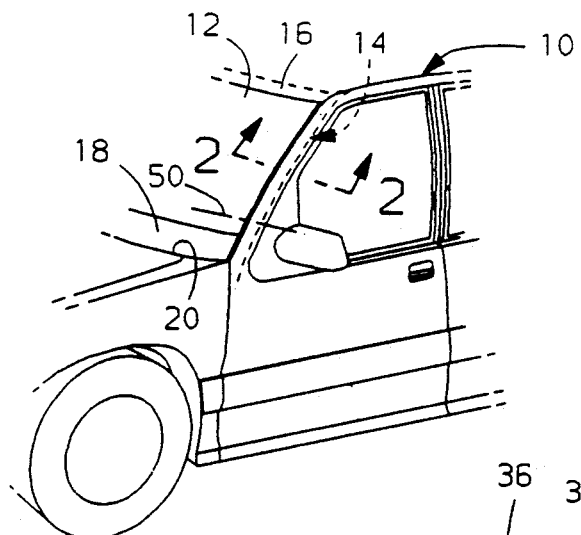
FIG. 1 is a perspective view of the forward quarter of a motor vehicle.
Figure 2:
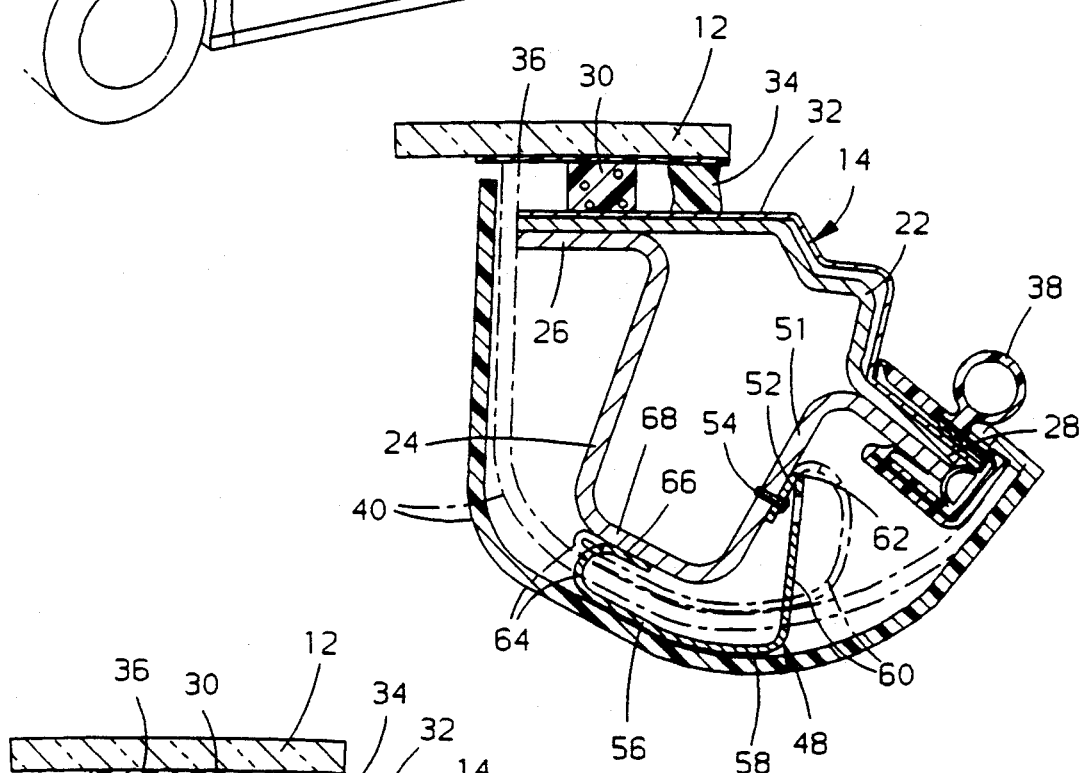
FIG. 2 is a sectional view taken in the direction of arrows 2—2 in FIG. 1. The bracket and molding are shown in a deflected position in phantom.

Referring to FIG. 1, it is seen that a vehicle body 10 has a windshield 12 that is supported on the side by a pillar 14, commonly called an "A" pillar. A header 16 extends between the pillars above the windshield 12 as shown in FIG. 1. A dashboard 18 is located in proximity to a lower edge 20 of the windshield 12. Referring to FIG. 2, the pillar 14 has an outer pillar component 22 and an inner pillar component 24. The components 22 and 24 are channel shaped and open towards each other. The components 22 and 24 are spot welded together at an inner extending wall 26, which is generally parallel to the windshield 12, and at an outer extending wall 28.

Referring to FIG. 2, a foam spacer 30 secured to a front face 32 of the outer pillar component 22 spaces the windshield 12 from the pillar 14. A urethane adhesive 34 secures the windshield 12 to the pillar 14. The windshield 12 has a black coating 36 which prevents the foam spacer 30 and the urethane adhesive 34 from being seen from the exterior of the vehicle body 10. A primary seal 38 mounts to the outer extending wall 28 of the pillar 14 for sealingly engaging the door, not shown.

A molding 40 of plastic or other suitable material covers the pillar 14, hiding the pillar 14 from view from the interior of the vehicle for improving the aesthetics of the vehicle.

An energy absorbing bracket 48 is interposed between the pillar 14 and the molding 40, as seen in FIG. 2. The bracket 48 is made of a 0.030 inch thick sheet metal stamping. The one-piece bracket 48 extends three quarters the way down the pillar 14 from the header 16 with the bracket 48 ending generally indicated at 50 in FIG. 1. The bracket 48 has a base 52 which is attached to a side wall 51 of the inner pillar component 24, near the outer extended wall 28, by a pair of screws or bolts 54. The screws 54 are located near the top and bottom of the bracket 48, respectively. The bracket 48 is attached to the pillar 14 near the outer extending wall 28 to facilitate the installation of the bracket 48 on an assembly line. The bracket 48 is mounted to the pillar 14 prior to the installation of the molding 40.

A mounting portion 56 of the bracket 48 conforms with the shape and underlies the molding 40. A double side adhesive tape 58 is placed between the molding 40 and the mounting portion 56 of the bracket 48 to secure the molding 48 to the bracket 48 and the vehicle body 10. A support portion 60 projects normal from the mounting portion 56 and connects the mounting portion 56 to the base 52 spacing the molding 40 from the pillar 14. A reverse bend is formed where the base 52 and the support portion 60 connect so that the support portion 60 overlies the base 52. A curved portion 64 connects the mounting portion 56 to a foot 66 of the bracket 48, where the foot 66 frictionally engages a flat top portion 68 of the pillar 14. The curved portion 64 is a buckling portion 64 which adapts to undergoing energy absorbing plastic deformation when subject to a force of impact transmitted through the molding 40. The frictional engagement of the foot 66 with the flat top portion 68 of the pillar 14 ensures, by maintaining contact, that the curved buckling portion 64 does not disengage the pillar 14. The foot 66 generally underlies the mounting portion 56 with the mounting portion 56 spaced 0.75 inches from the flat top portion 68 of the pillar 14.

When the molding 40 is impacted, the foot 66, which is already in engagement with the pillar 14, is held in engagement with the pillar 14 by the force of the impact, with the resulting friction ensuring that the foot 66 does move relative to the pillar 14. The force, or load, on the molding 40 and bracket 48 builds up until the force of the impact is sufficient to cause the curved buckling portion 64 to buckle. With the resulting energy absorbing plastic deformation of the bracket 48 caused by the impact load absorbing the energy of impact. Upon the buckling of the curved buckling portion 48, the bracket goes from the solid position in FIG. 2 to a typical deformed position shown in phantom in FIG. 2. While the support portion 60 function is to connect the molding 40 to the pillar 14, the support portion 60 will also absorb energy by energy absorbing plastic deformation when the molding 40 is impacted.

Figure 3:
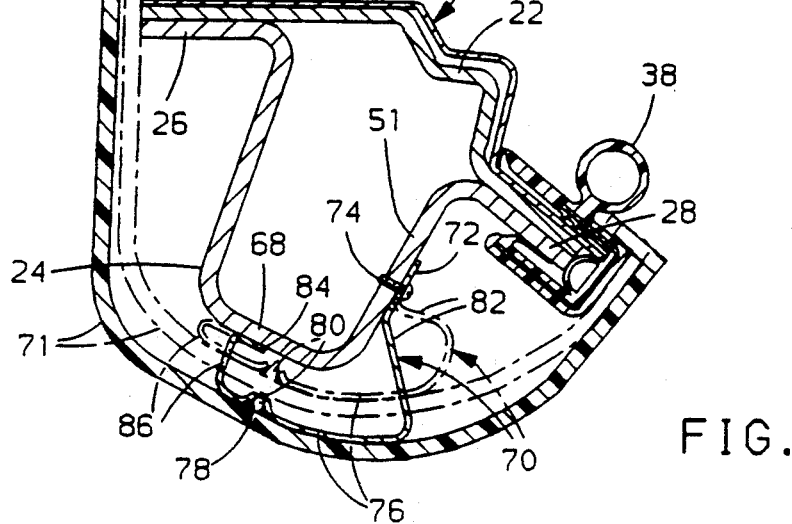
FIG. 3 is a sectional view of the second embodiment. The bracket and molding are shown in a deflected position in phantom.

The second embodiment shown in FIG. 3 has an energy absorbing bracket 70 made of similar material as the first embodiment with like elements having like reference numbers. The energy absorbing bracket 70 is inserted between the pillar 14 and a molding 71. A base 72 of the bracket 70 is attached to the inner pillar component 24 near the outer extending wall 28 by a pair of screws or bolts 74 located near the top and bottom of the bracket 70, similar to the first embodiment. The one-piece bracket 70 extends three quarters the way down the pillar 14 from the header 16.

A mounting portion 76 conforms to the shape of the molding 71. A plurality of holes 78 in the bracket 70 receive aligned tabs 80 molded integrally in the molding 71 to secure the molding 71 to the bracket 70 and the vehicle body. A support portion 82 of the bracket 70 connects the mounting portion 76 to the base 72 and spaces the molding 71 from the flat top portion 68 of the pillar 14, and the support portion 82 projects normal from the mounting portion 76 towards the side wall 51 of the pillar 14 and the base 72. A foot 84 of the bracket 70 engages the flat top portion 68 of the pillar 14. A buckling portion 86 connects the mounting portion 76 to the foot 84 and adapts to undergoing energy absorbing plastic deformation when subject to a force of impact transmitted through the molding 71. The straight buckling portion 86 is generally perpendicular to the flat top portion 68 of the pillar 14 with the mounting portion 76 is spaced 0.75 inches from the flat top portion 68.

When the molding is impacted, the molding acts similarly to the first embodiment, the foot 66 is held in engagement with the pillar 14 with the resulting friction ensuring that the foot 84 does move relative to the pillar 14. The force, or load, on the molding 71 and bracket 70 builds up until the force of the impact is sufficient to cause the buckling portion 86 to buckle. With the resulting energy absorbing plastic deformation of the bracket 70 caused by the impact load absorbing the energy of impact. Upon the buckling of the straight buckling portion 86, the bracket goes from the solid position in FIG. 3 to a typical deformed position shown in phantom in FIG. 3. While the support portion 82 function is to connect the molding 71 to the pillar 14, the support portion 82 will also absorb energy by energy absorbing plastic deformation when the molding 71 is impacted.

Figure 4:
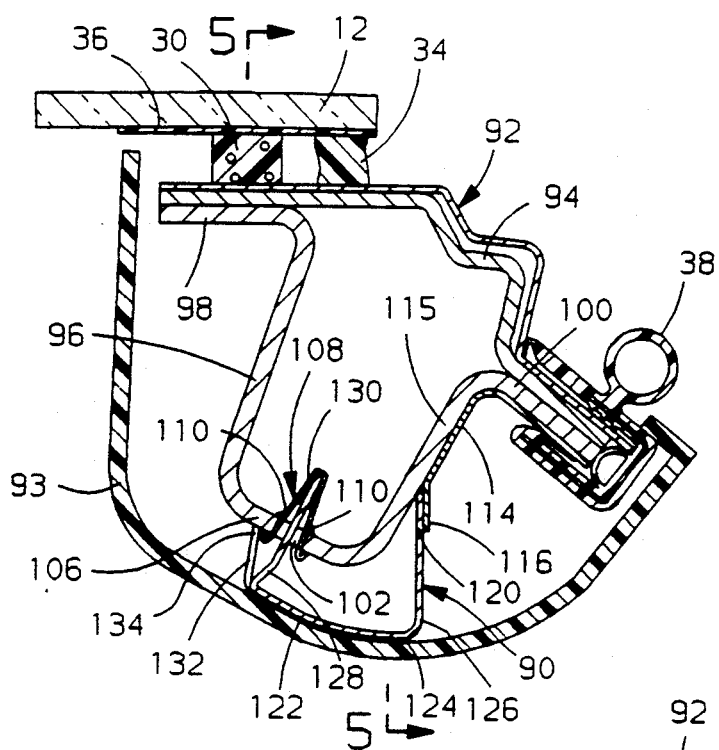
FIG. 4 is a sectional view of the third embodiment.
Figure 5:
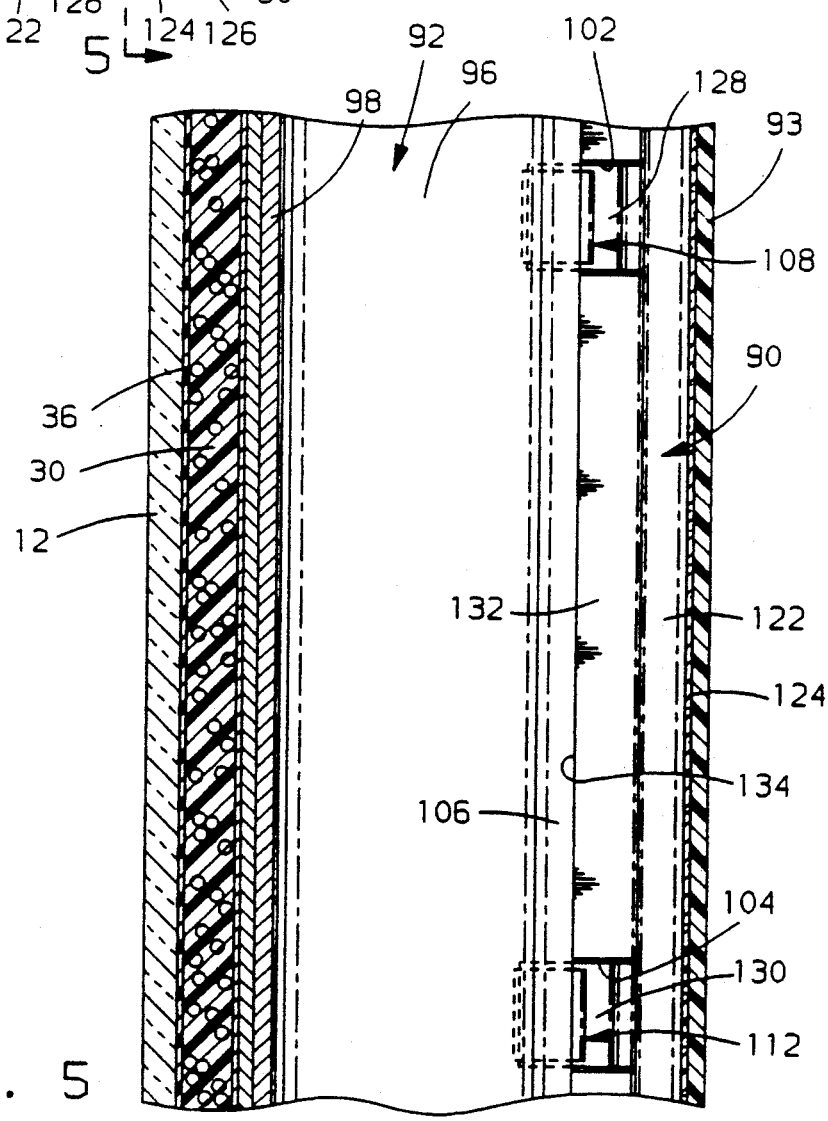
FIG. 5 is a sectional view taken in the direction of arrows 5—5 in FIG. 4.

The third embodiment shown in FIGS. 4 and 5 has an energy absorbing bracket 90 made of similar material as the first two embodiments and is located between a pillar 92 and a molding 93. Like elements have like reference numbers. The pillar 92 is similar to the pillar 14 of the first two embodiment having an outer pillar component 94 and an inner pillar component 96 of channel shape and open towards each other. The components 94 and 96 are likewise spot welded together at an inner extending wall 98 and an outer extending wall 100. In addition, the pillar 92 in the third embodiment has a pair of slots 102 and 104 located on a flat top portion 106 of the inner pillar component 96 of the pillar 92, as seen in FIGS. 5 and 4. A spring steel clip 108 is received in the slot 102 and secured by a series of barbs 110. A second spring steel clip 112 with barbs is located in the slot 104. A keeper plate 114 runs along side wall 115 of the inner pillar component 96 and is spot welded, or otherwise suitably attached, to the inner pillar component 96 at the inner extending wall 98. A flange end 116 of the keeper plate 114 angles away from the pillar 92 to facilitate installation of the bracket 90, as is described below. The one-piece bracket 90 extends three quarters the way down the pillar 14 from the header 16.

Referring to FIG. 4, the bracket 90 has a base 120 which is seated between the keeper plate 114 and the inner pillar component 96. A mounting portion 122 of the bracket 90 conforms with the shape and underlies the molding 93. A double sided adhesive tape 124 is placed between the molding 93 and the mounting portion 122 of the bracket 90 to secure the molding 93 to the bracket 90. A first support portion 126 connects the mounting portion 122 to the base 120 and spaces the molding 93 from the flat top portion 106 of the pillar 92.

Referring to FIG. 5, a pair of tabs 128 and 130 project from the mounting portion 122. The tab 128 projects into the slot 102 and is received by the spring steel clip 108 being held in place by a series of barbs, not shown. The other tab 130 is similarly secured in slot 104 by the other clip 112. A buckling portion 132 projects continuously along the lateral edge of the mounting portion 122 of the bracket 90 except where interrupted by the two tabs 128 and 130. A free edge 134 of the buckling portion 132 engages the flat top portion 106 of the pillar 92. The buckling portion 132 and the tabs 128 and 130 angle away from each other as they project from the mounting portion 122.

The energy absorbing bracket 90 in the third embodiment is mounted to the molding 93 prior to installing to the pillar 92, as compared to the first two embodiments where the bracket is mounted to the pillar prior to the molding being added.

When the molding 93 is impacted, the free edge 134 of the buckling portion 132, which is already in engagement with the pillar 92, is forced towards the pillar 14 with the resulting friction ensuring that the free edge 134 does move relative to the pillar 92. The force, or load, on the molding 93 and bracket 90 builds up until the force of the impact is sufficient to cause the buckling portion 132 to buckle. With the resulting energy absorbing plastic deformation of the energy absorbing bracket 90 caused by the impact load absorbing the energy of impact. Upon the buckling of the buckling portion 132, the free edge 134 of the buckling portion 132 slides away from the tabs 128 and 130 to a deformation position. The first support portion 126 and the tabs 128 and 130 also absorb energy by energy absorbing plastic deformation when the molding 93 is impacted.

While three embodiments of the present invention have been explained, various modifications within the spirit and scope of the following claims will be readily apparent to those skilled in the art.

For example the thickness of the metal can be varied to achieve the desired deformation characteristic. A polycarbonate elastic bracket could be used instead of metal. The distance between mounting portion of the bracket and the pillar could be reduced and a pad could be added.

The embodiments of the invention in which an exclusive property or privilege is claimed are defined as follows:

1. In a motor vehicle having a pillar covered by a molding, the improvement comprising:
   a one-piece energy absorbing bracket interposed between the pillar and the molding including
   a mounting portion conforming to the shape of the molding and carrying the molding;
   a pair of projecting portions projecting generally normal from the mounting portion towards the pillar and at least one of the projecting portions mounted to the pillar for securing the molding to the pillar and the pair of projecting portions engaging the pillar adapted to undergoing deformation when subject to a force of impact transmitted thorough the molding.

2. An assembly for mounting a molding to a vehicle body having a windshield supported by a pillar, the assembly comprising:
   the pillar having an outer pillar component and an inner pillar component with the components mounted together;
   a one-piece energy absorbing bracket interposed between the pillar and the molding having a base mounted to the inner pillar component, a mounting portion conforming to the shape of the molding and carrying the molding, a support portion connecting the mounting portion to the base and spacing the molding from the pillar, a foot engaging the pillar for stability of the bracket relative to the pillar, and a buckling portion connecting the mounting portion to the foot and adapted to undergoing deformation when subject to a force of impact transmitted through the molding.

3. An assembly as in claim 2 wherein each component of the pillar has a channel shaped and open towards each other.

4. An assembly for mounting a molding to a vehicle body having a windshield supported by a pillar, the assembly comprising:
   the pillar having an outer pillar component and an inner pillar component with each component having a channel shape and open towards each other and the components mounted together;
   an energy absorbing bracket interposed between the pillar and the molding having a base mounted to the inner pillar component, a mounting portion conforming to the molding and carrying the molding, a support portion connecting the mounting portion to the base and spacing the molding from the pillar, a fool engaging the pillar, and a buckling portion connecting the mounting portion to the foot and adapted to undergoing deformation when subject to a force of impact transmitted through the molding.

5. An assembly as in claim 4 wherein the mounting portion is spaced 0.75 inches from the pillar.

6. An assembly as in claim 5 wherein the bracket extends on the pillar from the top of the windshield to a quarter of the way up from the bottom of the windshield.

7. An assembly as in claim 4 wherein the bracket is made of a 0.030 inch thick sheet metal stamping.

8. An assembly as in claim 4 wherein the molding is carried by the mounting portion by a double sided adhesive tape placed between the molding and the mounting portion of the bracket.

9. An assembly as in claim 4 wherein the molding is carried by the mounting portion of the bracket by a plurality of tabs molded integrally with the molding which are received by a plurality of holes in the mounting portion of the bracket.

10. An assembly for mounting a molding to a vehicle body having a windshield supported by a pillar, the assembly comprising:
    the pillar having an outer pillar component and an inner pillar component with each component having a channel shape opening towards each other and the components mounted together with the inner pillar component having a pair of slots;
    a keeper plate mounted to the inner pillar component having a flange edge projecting away from the inner pillar component; and
    an energy absorbing bracket interposed between the pillar and the molding having a base carried between the inner pillar component and the keeper plate, a mounting portion conforming to the molding and carrying the molding, a support portion connecting the mounting portion to the base and spacing the molding from the pillar, a pair of tabs projecting from the mounting portion and received by the slots in the inner pillar component for securing the bracket to the pillar, and a buckling portion integrally formed with the mounting portion and extending between the mounting portion and the inner pillar component and adapted to undergoing deformation when subject to a force of impact transmitted through the molding.

* * * * *